G. A. KELSALL.
CORE LOSS TESTER.
APPLICATION FILED JUNE 17, 1916.
1,296,813.
Patented Mar. 11, 1919.
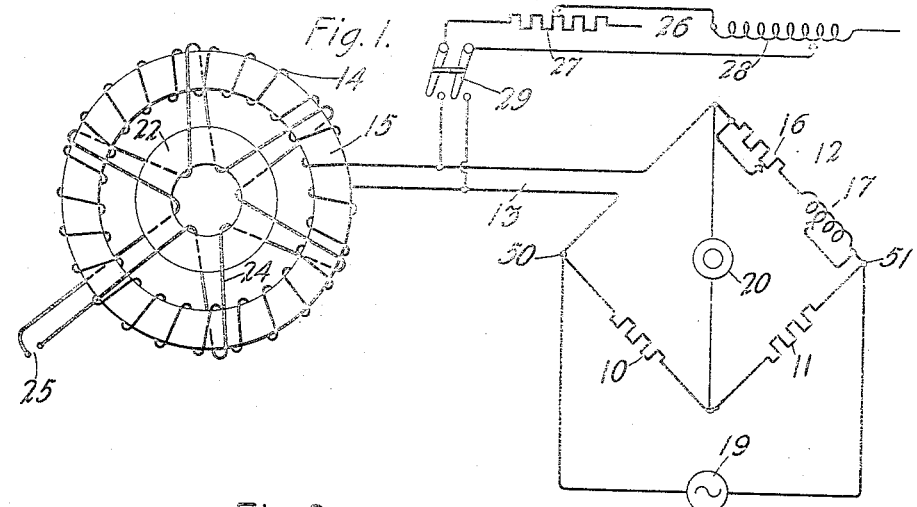
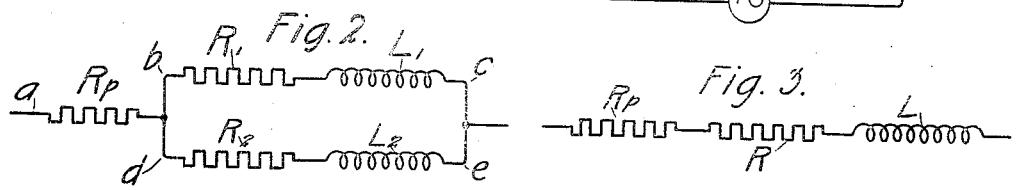
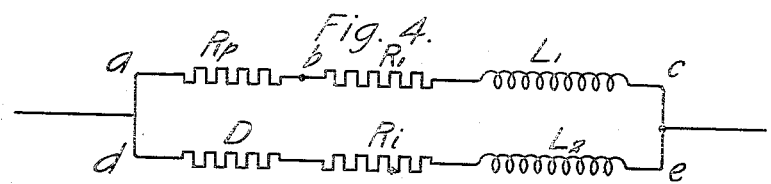
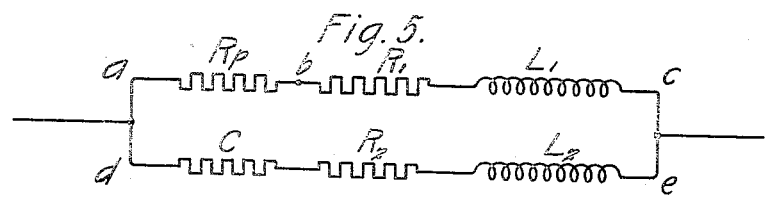
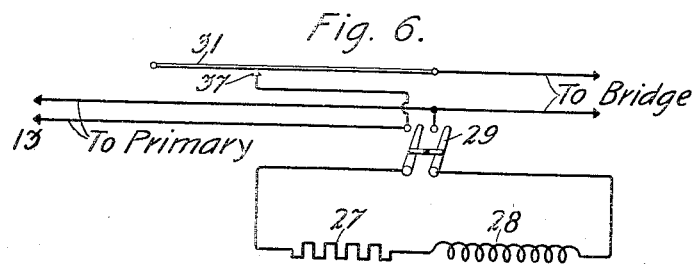
Inventor:
George A. Kelsall.
by A. C. Hunne, Att'y.

UNITED STATES PATENT OFFICE.

GEORGE A. KELSALL, OF NEW YORK, N. Y., ASSIGNOR TO WESTERN ELECTRIC COMPANY, INCORPORATED, OF NEW YORK, N. Y., A CORPORATION OF NEW YORK.

CORE-LOSS TESTER.

1,296,813.   Specification of Letters Patent.   Patented Mar. 11, 1919.

Application filed June 17, 1916.   Serial No. 104,183.

*To all whom it may concern:*

Be it known that I, GEORGE A. KELSALL, a citizen of the United States, residing at New York, in the county of New York and State of New York, have invented certain new and useful Improvements in Core-Loss Testers, of which the following is a full, clear, concise, and exact description.

This invention relates to a method and means for measuring the losses in such materials as are used for the cores of inductance coils, and in particular to annular cores of iron, such as are used for loading coils in telephonic transmission.

Heretofore it has been customary in finding the losses to wind such an annular core with a coil similar to that with which it is to be finally used and to then take measurements by an impendance bridge method or other suitable method. Considerable time and expense are, however, required in the winding of these cores and in the baking and treatment of the windings, which are necessary in order to obtain reliable results. This becomes a particularly serious matter in case a large number of cores are to be examined for the purpose of sifting out and eliminating those which fall below a certain standard. For the reasons then, of finding the core losses and of sifting out the unsatisfactory cores, it is desirable to have some method of taking measurements without such winding and treatment, and which will at the same time be adapted for ready and accurate readings.

To this end a method has been developed whereby certain readings or observations are obtained with a core having but a few turns which may be readily applied and which readings will, by the use of certain equations, lead to the desired information.

The method herein described depends on using a standard primary coil which can readily be linked by a few turns of a closed secondary winding to the core to be tested. The magnetic and electrical properties of the core produce reactive effects upon the primary coil which appear to change the properties or electrical magnitudes of said primary. These apparent changes may be made use of directly to calculate the properties of the core to be tested. The transformations are, however, in this case exceedingly difficult and subject to relatively large errors. It has been found that by the use of a so-called substitution circuit used in connection with the primary to simulate the effect of the secondary, the necessary equations and transformations become much simpler.

The invention will be better understood by reference to the following specification and accompanying drawing, in which Figure 1 shows a diagrammatic sketch of a circuit arrangement used for making the necessary observations; Figs. 2 to 5 represent transformation circuits, by means of which the necessary equations may be better understood; Fig. 6 shows a circuit arrangement for more accurate work.

Referring now to Fig. 1, there is shown an impedance bridge or network of the Wheatstone type with the four arms 10, 11, 12 and 13. The arm 13 contains a standard coil, hereafter called the primary coil or winding, and this coil contains a large number of turns 14, wound on a core 15 of finely divided iron, such as strands of wire. The arms 10 and 11 consist preferably of non-inductive resistances, and the arm 12 includes a variable non-inductive resistance 16 and a variable inductance 17. Connected across two diagonal corners of the bridge is a source of alternating current 19, which may be of any suitable frequency, and it has been found that a frequency of 800 or 1,000 is particularly desirable. Across the other diagonal of the bridge is connected a telephone 20, and the magnitudes of the various arms are so selected that the bridge may be balanced for any desired frequency by the adjustment of the resistance 16 and the inductance 17.

Although the piece of iron may be within, on top of or entirely without the primary, it has been found very convenient in the case of testing cores for loading coils to make the core 15 of such dimensions that the core 22 to be tested, may be inserted within said core 15, as shown in the figure. A coil 24 is wound to include both the primary core 15 and the core 22. This winding 24 consists of a few turns only, such, for example, as ten or twenty, and has, at 25, a switch or contact whereby this winding, herein spoken of as the secondary winding, may be conveniently opened or closed. As will be indicated by the equations hereinafter, it will be apparent that the number of turns in the primary coil 14 and in the secondary coil 24 may have almost any reasonable value. In practice, however, it is found that the coil 14 should, preferably, have a large number of turns, and the coil 24 a relatively small number of turns. Theoretically, one turn would be sufficient for the coil 24, but, in practice, it is found desirable to use a larger number of turns in order that the slight variations in the resistance of the switch 25 shall be quite small compared to the resistance due to losses in the core to be tested, and in practice I find that from ten to twenty turns is a suitable number, while the primary 14 may have about fifteen hundred turns. It is not necessary that the turns of this coil 24 shall be exactly uniformly distributed, but only approximately so, such approximation as may be obtained with reasonable care in winding by hand. It is desirable that the resistance of this coil 24 be kept as small as possible, and, therefore, the conductor used should be made short and of large cross-section, the dimensions being such that it will still be quite flexible. It is also desirable, both for the purpose of increasing flexibility and to eliminate eddy currents that this conductor be made of finely stranded insulated wire built up into one conductor in any suitable manner.

In parallel to the primary coil 14 is connected a so-called substitution circuit 26 which includes a variable non-inductive resistance 27 and a variable inductance 28 which may be in the form of an inductometer. By means of a switch 29, this substitution circuit may be connected or disconnected from the circuit at will.

In brief, the method of operation for making the necessary measurements to calculate the losses of the core 22 is as follows:

With the switches 25 and 29 open, the bridge is balanced and readings obtained thereby of the effective resistance and inductance of the primary coil 14 with its core 15. The switch 25 is then closed and the bridge again brought to balance. In order to now restore the balance, it is necessary to make certain changes in the resistance 16 and the inductance 17, these changes being due to the effect produced upon the primary coil 14 by the effective resistance and inductance of the coil 24 and the core 22, which effective resistance and inductance are determined by the resistance of the coil 24 and the permeability, dimensions and core losses of 22. Having now obtained balance, the switch 25 is opened, whereupon the balance will be destroyed. Without changing the setting of 16 and 17 the switch 29 is now closed, and the resistance 27 and inductance 28 are so adjusted as to restore balance. It is then apparent that the effect of this substitution circuit, connected in parallel to the primary 14, is the same as that due to the core 22 and the winding 24, and by means of the readings thus obtained, and the equations to be set forth hereinafter, the information desired in regard to the core 22 may be calculated.

In practice it is not necessary to take measurements on the primary alone, for the proper values of readings may be found once for all for any given frequency and temperature. These may then be placed in tables or plotted in the form of curves for future reference.

There will be certain losses in the winding 24 itself and these may be obtained by replacing the core with a non-magnetic and non-conducting dummy, such as wood, of preferably the same dimensions as the core. Having obtained the proper readings, the actual loss due to the winding may be obtained by the equations given hereinafter, and this may be subtracted from the total secondary loss to give the core loss. In general, however, it is only necessary to take the readings and use them in the proper equation to give the core loss directly as explained hereinafter.

There are several approximately equivalent transformer circuits which are satisfactory for a great many purposes in a theoretical study of such transformers as shown here, but which are not satisfactory for the present purposes on account of the extremely small losses sometimes to be measured. Therefore, in developing the theory of the core tester, it is necessary to use equivalent transformer circuits which are rigorously correct. The equivalent electric circuits of the core tester used in obtaining the desired equations are shown in Figs. 2 to 5, and are explained below. In the equations given hereinafter, the following notation is used:

$C$ = Resistance correction (as defined below).
$D$ = Reading of the variable dial box resistance in the substitution circuit.
$L$ = Reading of inductance on impedance bridge.
$L_1$ = Inductance of primary.
$L_2$ = Total inductance of secondary referred to primary.
$R$ = Resultant resistance of circuits $bc$ and $de$ of Fig. 2.
$R_1$ = Effective resistance of the primary due to the core of the primary.
$R_2$ = Total effective resistance of secondary referred to primary.
$R_i$ = Effective resistance of the inductometer used in the substitution circuit.
$R_p$ = Direct current resistance of the primary winding.

With the notation above, the following formulæ can be obtained by means of the circuit shown in Fig. 2:

$$L = \frac{L_2 R_1^2 + L_1 R_2^2 + \omega^2 L_1 L_2 (L_1 + L_2)}{(R_1 + R_2)^2 + \omega^2 (L_1 + L_2)^2} \quad (1)$$

$$R = \frac{R_1^2 R_2 + R_1 R_2^2 + \omega^2 L_1^2 R_2 + \omega^2 L_2^2 R_1}{\omega^2 (L_1 + L_2)^2 + (R_1 + R_2)^2} \quad (2)$$

Using only those terms which contain $\omega^2$, the others being negligible, the above equations reduce to $$L = \frac{L_1 L_2}{L_1 + L_2} \quad (3)$$

$$R = \frac{L_1^2 R_2 + L_2^2 R_1}{(L_1 + L_2)^2} \quad (4)$$

Fig. 2 is the equivalent parallel circuit of the core tester, and Fig. 3 is the equivalent series circuit of the core tester. Fig. 3 represents the values of effective resistance and inductance that would be obtained from the readings of the setting on the impedance bridge, and are equal to L and R of equations 3 and 4, with the addition of $R_p$. Equation 3 is the fundamental equation which is used for finding the permeability of the core 22, and equation 4 is the important equation for finding the core losses, and is found to be a very close approximation to the rigorous formula 2.

Fig. 4 represents the condition when the secondary is open and a balance restored on the impedance bridge by the substitution circuit connected across the primary terminals. This figure is equivalent to Figs. 2 and 3, since the setting of the bridge has not been disturbed by the adjustment of the dial box resistance and the variable inductometer in the substitution circuit. The substitution circuit $de$, Fig. 4, however, is not equivalent to $de$ of Fig. 2, since in Fig. 4 the terminal $d$ is connected to point $a$ instead of point $b$ as in Fig. 2. Circuit $de$, Fig. 4, is, however, equal to circuit $de$ of Fig. 5, which equals the circuit $de$ of Fig. 2, with the addition of a resistance correction C. The value of this correction C in terms of $R_p$, $L_1$ and $L_2$, is obtained by the aid of equation 4, and can be shown to be $$C = \left(1 + 2\frac{L_2}{L_1}\right) R_p \quad (5)$$

It will now be shown how the above formulæ are utilized in making measurements of effective resistance with the core tester. In addition to the notation already given, the following notation is used:

$C_1$ = Resistance correction, defined above, for the case with no core inserted in the secondary.
$C_2$ = Resistance correction C with an iron core inserted in the secondary.
$D_1$ = Resistance in the substitution circuit as indicated by the dial box reading with no core inserted in the secondary.
$D_2$ = Resistance in the substitution circuit as indicated by the dial box reading with the core inserted in the secondary.
$L_1'$ = Inductance of primary corresponding to the voltage and frequency used on the bridge when taking reading on the secondary alone.
$L_1''$ = Inductance of primary corresponding to the voltage and frequency used on the bridge when taking reading with core inserted in the secondary.
$L_2'$ = Secondary inductance referred to primary, with no core inserted.
$L_2''$ = Secondary inductance referred to primary, with a core inserted in the secondary.
$R_c$ = Effective resistance due to core tested referred to primary.
$R_1'$ = Effective resistance of the inductometer in the substitution circuit with secondary alone.
$R_1''$ = Effective resistance of the inductometer in the substitution circuit, with a core inserted in the secondary.
$R_s$ = Effective resistance of the secondary cable referred to primary.

It is to be noted that two values of the effective resistance of the inductometer in the substitution circuit resistances are obtained since the resistance of the inductometer varies with the reading.

With the above notation the following equations, which are discussed below in the order listed, are used in making measurements with the core tester:

$D_1 + R_1' = C_1 + R_s$     (6) Secondary alone.
$D_2 + R_1'' = C_2 + R_s + R_c$     (7) With core inserted.
$R_c = D_2 - D_1 + R_1'' - R_1' - C_2 + C_1$     (8) From (6) and (7).

Equations 6, 7 and 8 are derived by equating circuit $de$ of Fig. 4 to $de$ of Fig. 5. Equation 6 is the equation which holds for the secondary alone with no core inserted. In this case $R_2$ in Fig. 5 is equal to $R_s$. Equation 7 is the equation which holds when the core to be tested is inserted in the secondary. In this case $R_2$ is equal to $R_s + R_c$. Combining equations 6 and 7, equation 8 is derived, which gives the effective resistance due to the core tested, based on the number of turns of winding equal to that of the primary. Equation 8 is further based on the assumption that the readings on secondary alone, and the readings with a core inserted for test, are taken at the same frequency, in which case $R_s$ is the same in equations 6 and 7.

Fig. 6 shows the connections of the core tester to the impedance bridge. The substitution circuit is connected and disconnected from the terminals of the primary by means of the switch 29. A slide wire resistance 31 is used for the purpose of obtaining more accurate balance on the bridge. This resistance is not necessary in all cases, but it enables the balance to be made somewhat closer than with the units ordinarily used in a step-by-step resistance, such as shown at 16. This resistance may be inserted either in arm 12 or arm 13 as desired.

In making tests for core losses, readings in the substitution circuit are taken with the secondary alone at the frequencies at which it is desired to measure the losses in the core to be tested, thus giving the corresponding values of $D_1$ and $L_1'$, and $L_2'$. The core to be tested is then inserted and readings taken again at the same frequencies, which gives the corresponding values of $D_2$ and $L_1''$ and $L_2''$. The secondary conductor with the core in and the core out should be wrapped around the primary the same number of times, and for the readings with the secondary alone a core of suitable size of non-conducting non-magnetic material may be used as a matter of convenience in forming the turns of the secondary. From the actual measurements thus taken upon the circuits under various conditions, the quantities $f$, $V$, $L_2$, $D$, $L_1$ and $R_1$ are known both with and without the core inserted. From these quantities it is thus possible to calculate the following results:

$$2\frac{L_2}{L_1}$$

may be obtained from the values $L_1$ and $L_2$. C, which is the resistance correction defined above, is obtained from equation 5. $R_c$, which is the effective resistance of the core tested, referred to primary, is then obtained from equation 8.

In general it is desirable to obtain the losses of the core at different frequencies. In this event it will be necessary to know the resistance of the secondary winding alone, referred to the primary, at these frequencies, which is equal to the D. C. resistance of the secondary, referred to the primary, plus a small additional effective resistance due to eddy current loss which varies with the frequency. Inasmuch as this depends on frequency and temperature alone, it is not necessary to take these readings for each core tested, but having once been determined, tables or curves may be constructed which show change of resistance of this secondary for different frequencies and temperatures.

In working with various materials, it has been found that most of the cores tested show an appreciable variation in iron loss for different flux densities. For this reason it is desirable or necessary to know the flux density at which the test is made. This may be found by using the same apparatus already described and certain of the readings taken in connection with the earlier part of the test mentioned. The method for doing this will now be described, and in developing the method for determining the flux density at which tests are made, the following notation is used in addition to that already given:

$B_m$ = Maximum flux density in the iron core tested.
$d$ = Mean diameter of core tested.
$f$ = Frequency at which test is made.
$H$ = Magnetizing force in C. G. S. units.
$I$ = Current flowing in a magnetizing winding on a given core.
$I_2$ = Current in branch $de$ of Fig. 2.
$N$ = Number of turns in a magnetizing winding on a core.
$L$ = Inductance of a magnetizing winding.
$V$ = Voltage applied to the inductance bridge at 50, 51 when making a measurement with the core tester.

With the above notation, the fundamental formula for determining the flux density at which the tests are made is given by $$H = \frac{2NI}{5d} \quad (9)$$

which gives the value of the magnetizing force at the mean radius of a toroidal core for a given number of turns in the magnetizing winding and for current I when $d$ is expressed in centimeters and I in amperes.

The magnetizing effect of the current in the secondary of the core tester is equal to the magnetizing effect of the current through the branch $de$ of Fig. 2, flowing through a number of turns equal to the number in the primary winding. The current $I_2$ through branch $de$ is equal, however, to $$\frac{V}{4\pi f L_2}.$$

This equation assumes that the ratio arms of the impedance bridge are equal and in series with respect to the source of current supply. Substituting this value of $I_2$ in place of I in equation (9), the following equation is obtained:

$$H = \frac{NV}{10d\pi f L_2} \quad (10)$$

Assuming that the magnetizing current is of the sine wave form, a maximum flux density is obtained from equation 10 by multiplying by the permeability and the square root of 2, which gives $$B_m = \frac{\sqrt{2}NV\mu}{10d\pi f L_2} \quad (11)$$

In one core tester which was used, the primary consisted of fifteen hundred turns; which was found to be a suitable number for a large variety of work, and in this case the equation becomes $$B_m = 67.6 \frac{V\mu}{dfL_2} \quad (12)$$

The permeability may be obtained in any desired manner by any of the well-known methods of obtaining the permeability of samples of iron.

Although this invention has been described as being applied to cores for loading coils to be used in telephone circuits, and the tests in such case would be carried on at telephonic frequencies, it is to be understood that the invention is not limited to such a specific application, but may be used for the testing of samples of magnetic material for any purpose desired, whether for high frequency or for low frequency, whether for high power or low power, and whether toroidal in form or otherwise. In case measurements are to be taken with low frequencies, such as used in power transmission, it will in general be desirable to replace the telephone receiver 20, which is particularly sensitive for telephonic frequencies, by some other indicator which has a high sensitivity for low frequencies. It is also to be understood that while the method has been shown and described in connection with a Wheatstone's bridge, that this is not necessary, and that the method consists broadly in taking certain readings on certain instruments with a core to be tested, which core is linked with a standard primary coil, and then replacing the secondary winding and its core by a substitution circuit to be used in connection with the primary to simulate the effect of the secondary, this being preferably done by so adjusting said substitution circuit that the readings on the instruments mentioned above shall be the same as with the core itself. These readings are then used in connection with certain equations obtained by consideration of equivalent transformer circuits.

Having now described my invention, what I claim to be new and desire to secure by Letters Patent is:

1. The method of measuring core losses which consists in finding the effect of a core to be tested upon the intensity of the current flowing through a winding and producing in said current, by an equivalent circuit, a change proportional to said first change.

2. The method of measuring core losses which consists in finding the effect of a core to be tested upon the intensity of the current flowing through a winding and in producing in said current by an equivalent circuit a change equal to said first change.

3. A core loss tester comprising a primary winding, a core to be tested, a secondary winding linking the core to the primary, a substitution circuit adapted to be connected in parallel to or disconnected from the said primary, and means for measuring the electrical dimensions of the circuits under the different conditions whereby the actual core losses may be calculated.

4. A core loss tester comprising a balanced net work, one branch of which consists of a standard primary winding, a core to be tested, a secondary winding linking the primary with the core, a substitution circuit, and a switch for connecting said substitution circuit in parallel to the primary when the secondary circuit is opened whereby the effect of the core upon the primary may be simulated by the substitution circuit.

5. A core loss tester comprising a Wheatstone's net work, one branch of which consists of a standard primary winding, a source of alternating current impressed upon said net work, means whereby the net work may be balanced for the alternating current impressed thereupon, a core to be tested, a secondary winding linking the core to the primary, and a substitution circuit adapted to be connected in parallel to the primary winding when the secondary circuit is opened whereby the effect of the core upon the primary may be simulated by the substitution circuit.

6. In an apparatus for measuring core losses, a winding, a core to be tested, a source of current for said winding, means for finding the effect of said core upon the intensity of the current flowing through said winding, and means comprising an equivalent circuit for producing in said current a change proportional to said first change.

7. A core loss tester comprising a balanced network, one branch of which consists of a winding, a core to be tested, means for associating said core with said winding, a substitution circuit and a switch for associating said substitution circuit with said winding when said core is disassociated from said winding whereby the effect of the core upon said winding may be simulated by the substitution circuit.

8. A core loss tester comprising a balanced network, one branch of which contains a winding, a core to be tested, means for associating said core with said winding, means for changing the electrical values of a branch of said network to simulate the effect of said core or said winding whereby the actual core losses may be calculated.

In witness whereof, I hereunto subscribe my name this 15th day of June, A. D., 1916.

GEORGE A. KELSALL.